Figure 1:
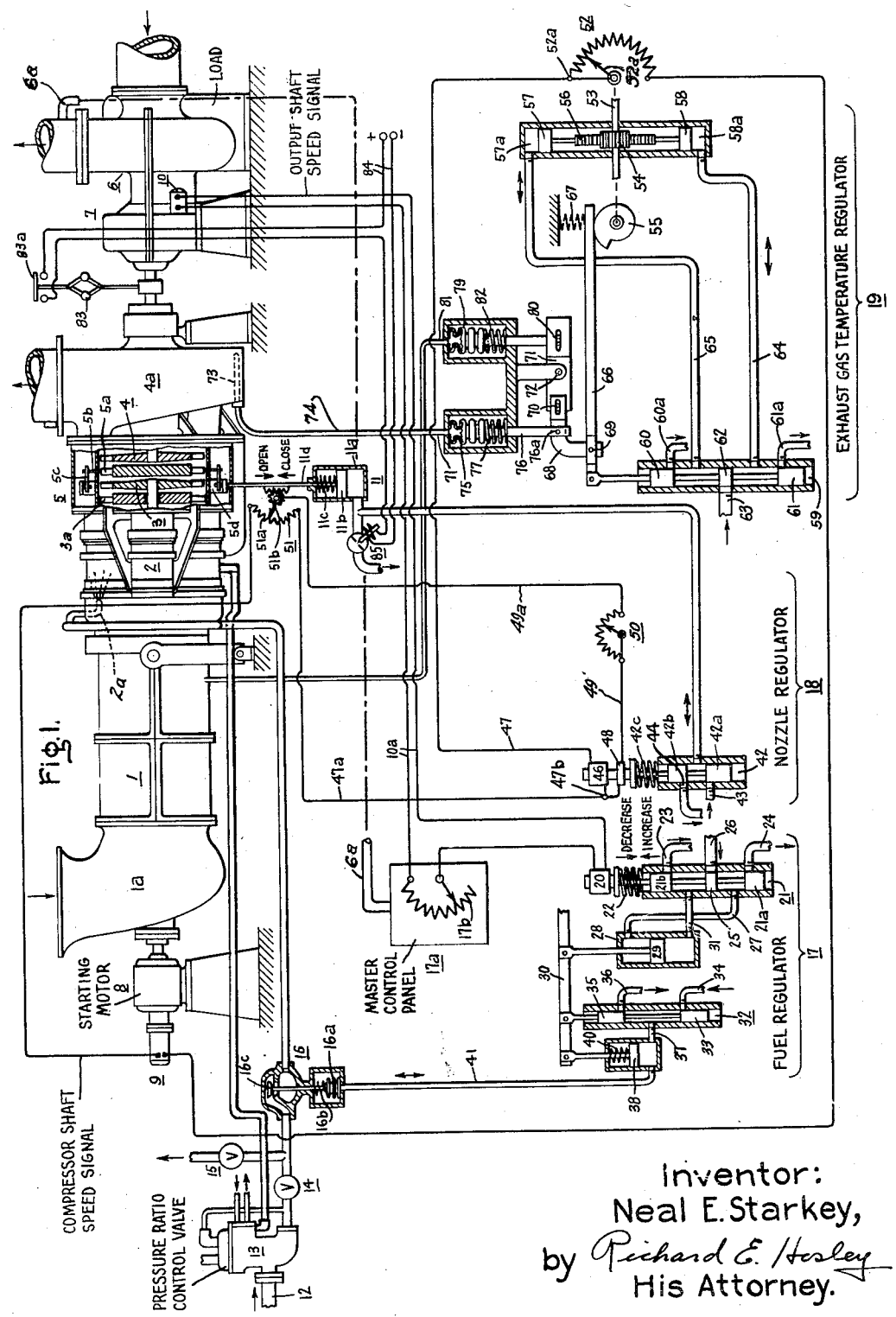

Patented Jan. 20, 1953

2,625,789

UNITED STATES PATENT OFFICE 2,625,789

REGULATOR FOR VARIABLE NOZZLE GAS TURBINE POWER PLANTS

Neal E. Starkey, Schenectady, N. Y., assignor to General Electric Company, a corporation of New York Application October 24, 1951, Serial No. 252,916

14 Claims. (Cl. 60—39.09)

This invention relates to gas turbine type prime movers, particularly to a regulating system for controlling a variable turbine nozzle in a gas turbine powerplant of the type having a turbine-compressor unit and a second turbine rotor for delivering the useful power output and mechanically independent of the turbine-compressor rotor, with a variable angle nozzle ring interposed between the compressor turbine and the load output turbine.

Gas turbine designers have previously noted that the flexibility of operation of a gas turbine powerplant is greatly improved if the turbine-compressor unit is divorced from the load output turbine unit, so that the speed of the compressor supplying air to the combustion system is independent of the speed desired for the power output shaft. Thus the compressor can be operated at a speed at which it is most efficient, while the speed of the load output turbine can vary as required by the nature of the power-consuming device to which it is connected. It is further found desirable to be able to vary the effective area and discharge angle of the nozzles supplying motive fluid to the load output turbine rotor, and to this end various means for adjusting a turbine nozzle have been proposed.

Among the advantages which may be mentioned for a gas turbine powerplant having two mechanically independent turbine rotors, one driving the compressor and the other driving the load output shaft, with a variable angle nozzle ring between, are the following:

1. A higher level of overall thermal efficiency may be maintained over a wider range of loads.

2. Overspeed protection may be readily provided for the load turbine, by arranging the variable angle nozzle to move automatically to a position in which the efficiency of the turbine is spoiled in the event the output shaft should suddenly lose its load.

3. The power required to start the plant is reduced since the starting motor need only turn over the turbine-compressor unit.

4. In the event the compressor efficiency should change during the life of the machine, as for instance due to the accumulation of dirt on the compressor blades, the effect of this efficiency change on the operation of the plant can be compensated for by suitably adjusting the nozzle regulating means.

5. It is possible to operate at 100% rated speed, as when synchronizing a gas turbine driving a generator to be interconnected with an electrical power distribution network, with no load on the generator and yet with the compressor-combustor-turbine unit operating on a self-supporting basis.

6. With various "water injection systems," it is essential to be able to alter the effective turbine nozzle area.

7. Auxiliary power for various purposes can be taken from the turbine-compressor rotor in varying quantities, without altering the rotor speed, by adjusting the nozzle.

8. Better operation is obtained with varying ambient atmospheric temperature conditions.

In order to obtain the full benefits of such a variable nozzle turbine powerplant, it is of course necessary to provide an adequate system for automatically adjusting the variable turbine nozzle so as to reconcile the sometimes conflicting needs of the various components of the plant.

Accordingly, the general object of this invention is to provide an improved regulating system for the variable nozzle of a gas turbine powerplant of the type described.

A more specific object is to provide a variable turbine nozzle regulator which will maintain the load output shaft speed constant at a preselected value, or vary it according to a desired schedule, and then vary the speed of the turbine-compressor rotor so as to maintain constant the overall thermal efficiency of the plant at a value as close as practicable to the maximum efficiency obtainable.

Figure 2:
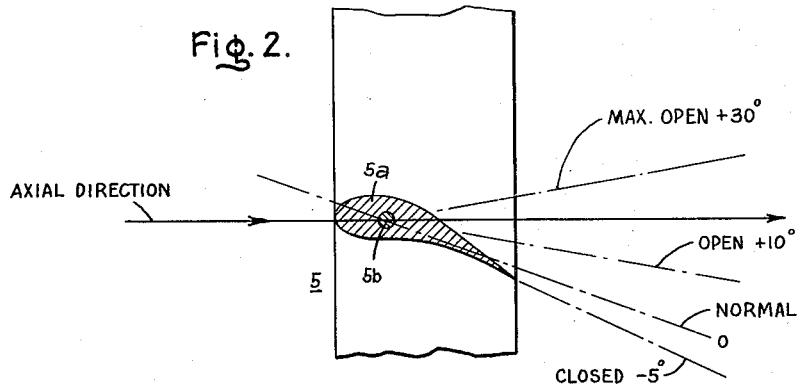
Figure 3:
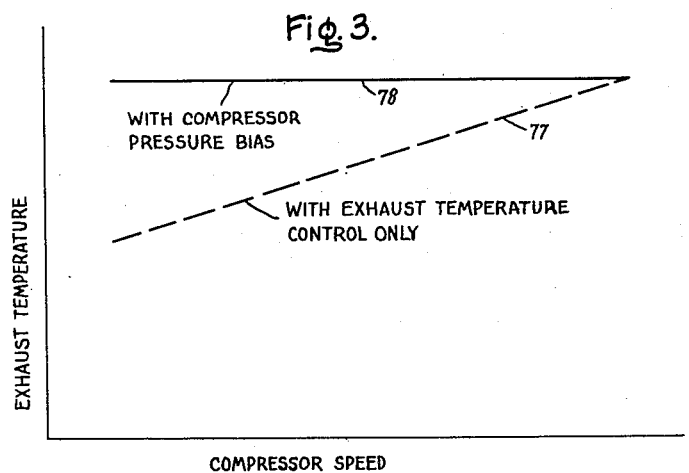

Other objects and advantages will become apparent from the following description taken in connection with the accompanying drawing, in which Fig. 1 is a diagrammatic representation of a gas turbine powerplant having a regulating system in accordance with the invention, Fig. 2 is a diagrammatic representation of the range of variation of the adjustable turbine nozzle, and Fig. 3 is a graphical representation of one operating characteristic of the plant.

Generally, the invention is practiced by providing control means which varies the fuel supply rate so as to maintain at a desired value the speed of the power output shaft, with other servo-mechanism for altering the variable nozzle ring of the output turbine in such a manner as to vary the speed of the turbine-compressor unit to hold turbine exhaust temperature at a substantially constant level.

Referring now more particularly to Fig. 1, the invention is illustrated as applied to a gas turbine powerplant of the "open cycle" type comprising a compressor 1, which may be of the multi-stage axial flow type, a combustion system indicated generally at 2, and a common turbine casing housing a high pressure turbine rotor 3 and a low pressure turbine rotor 4, the latter having a variable turbine nozzle ring indicated generally at 5.

The axial flow compressor 1 receives air from the ambient atmosphere through an inlet casing 1a and discharges high pressure air directly into the combustion system 2, which of course, has one or more suitable fuel nozzles, only one of which is indicated in dotted lines at 2a. The high pressure turbine rotor 3 is coupled directly to drive the compressor rotor and receives its hot motive fluid from the combustion system 2 by way of a ring of fixed turbine nozzles 3a, designed in accordance with conventional gas turbine practice. The load output turbine rotor 4 is connected to drive a suitable power consumer, indicated as being a centrifugal pump 6, which may be, for instance, a booster compressor in a gas pipe-line pumping system. It will, of course, be appreciated that this load might also take the form of a generator for delivery electrical power or the like. While a generator might be coupled directly to the turbine rotor 4, in the present instance the pump 6 is shown as being driven through a suitable reduction gear 7.

While the turbine rotors 3, 4 have been shown for purposes of illustration as each comprising a single bucket-wheel, it will be appreciated by those skilled in the art that either or both of these rotors may have a plurality of bladed wheels. The spent motive fluid discharged from turbine rotor 4 passes to the atmosphere through a suitable exhaust casing 4a. There may be incorporated in the plant various heat exchangers (not shown) for transferring thermal energy from the turbine exhaust to the high pressure air entering the combustion system, or for generating steam in a waste heat boiler, etc. Such variants of the gas turbine powerplant will be obvious to those skilled in the art, and such details are not necessary to an understanding of the present invention.

The operation of such a powerplant necessitates a considerable number of auxiliary devices, and only those necessary for understanding the present invention have been shown in Fig. 1. One of these is the starting motor, shown at 8 as being connected directly to the high pressure turbine-compressor rotor so that the compressor can be brought up to "firing speed" during the starting cycle, without the necessity for also bringing the output rotor 4 up to speed. Since it needs to turn only the turbine-compressor rotor, the starting motor 8 may be very much smaller than required in plants where the power consumer is connected to the compressor shaft.

Referring now more specifically to the control system, to which this invention particularly relates, the presence of several other auxiliary devices associated directly with the gas turbine plant must be noted. The speed of the compressor-turbine rotor is measured by an electrical tachometer generator 9, which may be conveniently connected directly to one end of the shaft of starting motor 8. Similarly, the speed of the load output rotor 4 is sensed by a second tachometer generator 10, which may be coupled directly to the shaft of the turbine rotor 4, or to the shaft of the power consuming load device 6, or to any suitable shaft in the reduction gear 7.

The variable turbine nozzle 5 consists generally of a circumferential row of adjustable nozzle guide vanes 5a, each adapted to be adjustably positioned about a radial axis by means of a projecting shaft 5b carrying a lever 5c connected by suitable link or pivot means to a nozzle adjusting ring 5d which completely encircles the turbine casing. All the adjustable turbine nozzle blades 5a are simultaneously positioned by circumferentially shifting the control ring 5d. This may be effected by a nozzle control motor 11, which may for instance take the form of a hydraulic cylinder 11a containing a power piston 11b biased downwardly by a coil spring 11c and adapted to be moved upwardly against the bias of the spring by hydraulic pressure admitted to cylinder 11a, as described more particularly hereinafter. Piston 11b may be carried on a piston rod 11d which is suitably connected to the nozzle adjusting ring 5d in such a manner that linear motion of piston 11b causes ring 5d to rotate about the axis of the powerplant. Such mechanical details of the adjustable nozzle 5 are not material to an understanding of the present invention, but are disclosed more particularly in the copending application of Bruce O. Buckland and Glen B. Warren, Serial No. 250,738, filed October 10, 1951, and assigned to the same assignee as the present application.

While such a gas turbine powerplant may be arranged to use a variety of different fuels, in the present case a gaseous fuel at a pressure which may be on the order of 150 p. s. i. g. is supplied through an inlet conduit 12 containing a "pressure ratio control valve" 13, stop valve 14, vent valve 15, and throttle valve 16. The details of the pressure ratio control valve 13 are described in the copending application of Neal E. Starkey, Serial No. 231,703, filed June 15, 1951, and assigned to the same assignee as the present application. It need only be noted here that the function of this valve is to automatically maintain constant the pressure ratio across the throttle valve 16 in order that the latter may more effectively perform its fuel regulating function. The stop valve 14 is merely a positive shut-off valve. The vent valve 15 serves to bleed to the atmosphere any fuel gas which may leak past the stop valve 14 when the plant is shut down. Valve 15 will, of course, be closed when the plant is in normal operation.

The throttle valve 16 is the primary control for the fuel supply rate to the combustion system 2, and is automatically positioned in the opening direction against the bias of spring 16b by servo means represented by a hydraulic motor including bellows 16a for positioning the flow control member 16c in accordance with a hydraulic signal pressure identified hereinafter as the "VCO" ("variable control oil") pressure. It will be readily apparent from Fig. 1 that the rate of fuel supply through the throttle valve 16 will be a function of the VCO pressure.

The invention is also obviously applicable to fuel systems supplying liquid fuels such as kerosene, gasoline, the heavy residual oils known to the trade as "Bunker C," or lighter fuel oils such as diesel fuel. Such liquid fuel systems, having fuel regulating means arranged to be positioned in accordance with a VCO hydraulic pressure signal are disclosed in the copending application of M. A. Edwards, H. M. Ogle, and D. E. Garr Serial No. 605,960, filed July 19, 1945; also U. S. Patent 2,558,592 issued June 26, 1951, in the names of Neal E. Starkey, Carl B. Lewis, and Martin A. Edwards, both assigned to the same assignee as the present application.

The regulating system shown in Fig. 1 comprises generally a fuel regulator servo mechanism 17 which establishes the VCO pressure for positioning fuel throttle valve 16, a master control panel 17a for telling fuel regulator 17 what load output is desired, a nozzle regulator 18 for controlling the nozzle positioning motor 11, and an exhaust temperature regulator 19 arranged to control the nozzle regulator 18.

The operation of these subcombinations may be stated broadly as follows: (1) Fuel regulator 17 positions throttle valve 16 to vary the supply of fuel to the combustion system so as to hold constant at a desired value the speed of the power output turbine 4. (2) The exhaust temperature regulator 19 causes the nozzle regulator 18 to position the nozzle control motor 11 in such a way that the speed of the compressor-turbine rotor 3 is caused to vary so as to hold exhaust gas temperature in the casing 4a at a pre-selected constant value.

The details of the fuel regulator 17 will first be noted.

The electrical output shaft speed signal from tachometer generator 10 is supplied by a circuit 10a to a solenoid 20 having an armature connected to position a hydraulic pilot valve indicated generally at 21. As will be apparent from the drawing, pilot 21 is biased in one direction by a coil spring 22, and the current in solenoid 20 positions the pilot against the bias of the spring. The pilot 21 comprises three axially spaced flow control disks, the end disks 21a, 21b being arranged to just block the drain ports 24, 23, respectively, when the pilot is in the "neutral" position shown, while the middle disk 25 is in aligned relation with the inlet port 26. It will be understood that hydraulic pressure is supplied from a suitable pump (not shown) to the inlet port 26, at a pressure which may be on the order of 300 p. s. i. The space intermediate disks 21a and 25 communicates by way of conduit 27 with the upper end of a cylinder 28 containing a piston 29 connected to position a lever 30. The space between pilot disks 25, 21b communicates by way of a conduit 31 with the lower end of cylinder 28.

It will be apparent that if pilot 21 moves downwardly, hydraulic liquid is supplied through port 26 by way of conduit 31 to the bottom of cylinder 28 so that piston 29 moves upwardly, while liquid passes from the upper end of the cylinder to drain 24. Conversely, if pilot 21 moves upwardly, operating liquid from port 26 is supplied by way of conduit 27 to the upper end of cylinder 28 to position piston 29 downwardly.

Connected to be positioned by lever 30 is the VCO pilot 32, which has a lower disk member 33 adapted to be in aligned position with the hydraulic supply port 34 when in the neutral position shown, and an upper disk 35 aligned with the drain port 36. Movement of pilot 32 downwardly causes hydraulic liquid to be supplied from port 34 through conduit 37 to the VCO pressure piston 38. Movement of pilot 32 upwardly causes the upper disk 35 to uncover the drain port 36 so that liquid from the VCO cylinder 39 will escape through drain port 36. As will be apparent in Fig. 1, piston 38 is connected to the left-hand end of lever 30, so hydraulic pressure supply to cylinder 39 positions piston 38 upwardly against the bias of a coil spring 40.

The overall function of fuel regulator 17 is to effect the supply of hydraulic operating liquid to cylinder 39 so as to establish therein a VCO hydraulic pressure signal which is proportional to the electrical speed signal supplied to solenoid 20. This VCO pressure is supplied by conduit 41 to the bellows 16a of the throttle valve 16. Thus the throttling member 16c of valve 16 is positioned in accordance with the speed of the turbine output rotor 4. A decrease in the speed of turbine 4 will result in a decreased electrical signal to solenoid 20, causing spring 22 to bias pilot 21 upwardly so that hydraulic operating liquid is supplied through conduit 27 to the upper end of cylinder 28, moving piston 29 downwardly, whereupon lever 30 rotates clockwise about its connection with piston 38 as a fulcrum, and pilot 32 is displaced downwardly to admit oil pressure through port 34 and conduit 37 to the VCO cylinder 39 so as to raise piston 38 against the bias of spring 40. This increases the hydraulic pressure in cylinder 39, which increased pressure is communicated to valve 16 so as to increase the supply of fuel to the combustion system 2. This increased fuel rate increases the energy available to turbine 4 so that its speed rises. Meanwhile, the upward movement of piston 38 has returned pilot 32 to the aligned position so that supply of hydraulic liquid through port 34 is discontinued. Conversely, movement of pilot 21 downwardly in response to an increased speed signal in solenoid 20 permits liquid to drain from the upper end of cylinder 28 by way of drain port 24 while the hydraulic liquid is supplied through conduit 31 to move piston 29 upwardly. This positions pilot 32 upwardly so that liquid drains from cylinder 39 through port 36, to lower piston 38, reduce the VCO pressure to close somewhat the throttle valve 16, and at the same time lower the left-hand end of lever 30 so as to return pilot 32 to the aligned condition.

It will be understood by those familiar with regulating systems of this general type, as described in U. S. Patent 2,390,084, issued December 4, 1945, on an application of M. A. Edwards that what is diagrammatically shown in Fig. 1 as a direct current generator 10 supplying an electrical speed signal directly to solenoid 20 will ordinarily be a small three-phase alternator, in combination with a three-phase full wave rectifier, for producing the direct current signal proportional to the speed of turbine rotor 4. It will also be understood that there will be some sort of "stabilizing coil" associated with solenoid 20, as described more particularly hereinafter in connection with the nozzle regulator 18 and detailed even more specifically in the above-identified Edwards Patent 2,390,084. Such electrical details are not necessary for understanding the present invention, and the illustration in Fig. 1 is intended to be only a diagrammatic representation of such previously known electrical means for positioning a hydraulic pilot in accordance with a speed condition in a power plant.

It is also to be noted that the fuel regulator lever 30 is not shown in its entirety. Actually, there may be a number of other servo mechanisms which all cooperate with piston 29 to establish the position of lever 30 in accordance with the integrated effect of numerous operating conditions in the power plant. For instance, there may be an over-temperature preventing servo having a temperature responsible bulb and suitable motor means (not shown) for acting on lever 30 to decrease the fuel supply in the event the exhaust temperature in casing 4a rises too high. One such over-temperature servo mechanism is disclosed in my U. S. Patent 2,528,252, issued October 31, 1950, and assigned to the same assignee as the present application.

The function of the master control panel shown diagrammatically at 17a is to modify the electrical signal from tachometer generator 10 so as to adjust to a desired value the speed which the fuel regulator 17 will maintain. This speed changing mechanism is shown diagrammatically as a simple rheostat 17b, which, of course, may be positioned manually to set the speed of output rotor 4 as desired, or it may be controlled automatically by various devices (not shown) so that the output shaft speed is varied to maintain constant some operating condition, such for instance as the discharge pressure of pump 6 communicated through the pressure signal conduit 6a. This master control panel is actually an extremely complex mechanism, including sequence timing motors, relays, etc., for automatically starting the power plant, bringing it up to idling speed, firing the combustion system, and then bringing the speed up to normal operating condition. Such details do not form a part of the present invention; but it may be noted that such an automatic control system is illustrated in the copending application of George R. Fusner and Chapman J. Walker, Serial No. 186,354, filed September 23, 1950, and assigned to the same assignee as the present application.

The servo mechanism for positioning the adjustable turbine nozzle 5 includes the hydraulic nozzle control motor described above, controlled by the nozzle regulator 18, the latter comprising a pilot 42 having a lower disk 42a arranged to uncover the hydraulic supply port 43 and an upper disk 42b adapted to uncover the drain port 44. The space between disks 42a, 42b communicates by way of conduit 45 with the nozzle control cylinder 11a. Thus the nozzle positioning piston 11b is biased upwardly against its spring 11c by the variable hydraulic pressure supplied by pilot 42.

Pilot 42 is arranged to be positioned by a nozzle control coil 46 to which is supplied an electrical signal by circuit 47 from the exhaust temperature regulator 19, described more particularly hereinafter. The nozzle control solenoid also includes a "stabilizing coil" shown at 48 as being connected in parallel with the control coil 46 and by way of conductor 49 with a nozzle adjusting rheostat 50 and stabilizing rheostat 51. It will be apparent from the drawing that the adjusting nozzle rheostat 50 serves to alter the total resistance in the circuit 49 so as to modify the operating characteristics of the stabilizing coil 48. The stabilizing rheostat 51 comprises a voltage dividing resistance 51a connected in the conductor 47a between the tachometer generator 9 and the terminal 47b between the control coil 46 and stabilizing coil 48. The movable contact 51b of stabilizing rheostat 51 is connected by conductor 49a with the stabilizing coil 48. This movable contact is arranged to be positioned as by the rack and pinion arrangement shown in the drawing or any other equivalent means, in accordance with the position of nozzle control piston 11b.

The current in the nozzle control solenoid 46, 48 is determined by the position of a nozzle setting rheostat 52 in the conductor 47. The movable contact 52a is connected to be positioned by a shaft 53 which also carries a pinion 54 and cam 55. The pinion 54 meshes with a rack 56 adapted to be positioned by a pair of opposed hydraulic pistons 57, 58, the supply of hydraulic actuating liquid to these pistons being controlled by hydraulic pilot 59.

Pilot 59 comprises end disks 60, 61 adapted to be in aligned relation with drain ports 60a, 61a, respectively, while the intermediate pilot valve disk 62 is arranged to uncover the hydraulic supply port 63. It will be apparent from the drawing that movement of pilot 59 downwardly uncovers the drain port 61a so that liquid passes from cylinder 58a through conduit 64, while operating liquid is supplied from inlet port 63 by way of conduit 65 to the upper cylinder 57a. This, of course, moves rack 56 downwardly to position the rheostat contact 52a. Conversely, movement of pilot 59 upwardly uncovers the drain port 60a and supplies liquid from inlet port 63 by way of conduit 64 to the lower piston 58, thus positioning rack 56 upwardly.

The exhaust temperature pilot 59 is connected to be positioned by a lever 66, the right-hand end of which is biased into contact with cam 55 by a spring 67.

The primary control of lever 66 is effected by a bell-crank lever 68 having one arm pivoted at 69 to lever 66, the other arm being pivoted at 70 to a second lever 71. Lever 71 is carried on a fixed fulcrum 72.

The temperature signal for regulator 19 is derived from a suitable fluid-filled bulb (which may contain argon, nitrogen, or other suitable inert gas) shown in dotted lines at 73 as being located in the exhaust casing 4a. The fluid pressure signal from the temperature sensitive bulb 73 is communicated by conduit 74 to a pressure responsive bellows 75 connected to position a rod 76, which is pivoted at 76a to the horizontal arm of bell-crank 68. It will be apparent from the drawing that member 76 is biased upwardly by a coil spring 77 and positioned downwardly against the biasing spring by the pressure signal communicated to bellows 75. It will be apparent that an increase in exhaust temperature will increase the pressure in bellows 75, position the pivot 76a downwardly so that lever 68 rotates counterclockwise about pivot 70, causing pivot 69 to move downwardly, with the result that lever 66 pivots counterclockwise about its contact with cam 55 to lower pilot 59. Conversely, a decrease in exhaust temperature will raise the pivot 76a causing lever 68 to pivot clockwise about fulcrum 70 so that lever 66 likewise pivots clockwise about the cam 55, to raise pilot 59.

It is found that the temperature-responsive bellows 75 by itself will not effectively maintain exactly constant the exhaust temperature in casing 4a. The variation permitted in exhaust gas temperature as compressor speed changes, when only the temperature responsive bellows 75 is operative, is represented graphically by the broken curve 77 in Fig. 3. However, in order that the powerplant will operate as close as possible to the permissible maximum temperature, in order to obtain best thermal efficiency, it is desirable that the exhaust temperature in casing 4a be kept more nearly constant, as represented by the solid curve 78 in Fig. 3. To this end, a second pressure-responsive bellows 79 is connected to position the right-hand end of lever 71 through a pivot 80. As will be apparent from the drawing, bellows 79 communicates by way of conduit 81 with the discharge end of compressor casing 1. Thus, the pivot 80 is positioned downwardly in accordance with the compressor discharge pressure acting on bellows 79 in opposition to the coil spring 82. The effect of this compressor discharge pressure bias is to hold the exhaust temperature constant, as represented by curve 78 in Fig. 3.

The overall operation of this variable nozzle regulating mechanism may be outlined as follows. Assume first that the exhaust temperature rises above the preselected desired value. The increase in pressure in bellows 75 will cause pivot 76 to descend, so that lever 68 pivots counterclockwise about fulcrum 70, lever 66 pivots counterclockwise about cam 55 to lower pilot 59, hydraulic liquid is supplied from port 63 through conduit 65 to cylinder 57a, forcing piston 57 downwardly, so that rack 56 rotates pinion 54 to position the rheostat contact 52a to increase the resistance in the nozzle setting rheostat 52 and thereby reduce the current in the nozzle control coil 46. This causes pilot 42 to be pushed upwardly by spring 42c so that liquid drains from nozzle control motor cylinder 11a through conduit 45 to drain port 44. This permits piston 11b to descend under the bias of spring 11c and the variable nozzle is moved in the opening direction. The resulting increase in effective area of nozzle 5 has the effect of increasing the pressure drop across the turbine wheel 3. The result is that the compressor-turbine rotor speeds up so as to pump more air through the combustion system. This increased supply of air dilutes the motive fluid so as to reduce the exhaust temperature. The increased speed of compressor 1 also results in an increased pressure signal in the compressor discharge pressure bellows 79, which causes pivot 80 to move downwardly so that lever 71 pivots clockwise about fulcrum 72, thus moving pivot 70 upwardly. This produces a modifying effect on the action of bell crank lever 68 such that the exhaust temperature is caused to approach more or less closely the constant curve 78 in Fig. 3. The precise nature of this modifying effect is, of course, determined by the size and mechanical characteristics of bellows 79, spring 82, and the relative lengths of the lever arms between pivots 70, 76a, 80, etc. If for some reason it should be desired that the curve 78 increase or decrease more or less as compressor speed changes, that can be accomplished by suitable mechanical design of the parts.

Conversely, if the exhaust temperature in casing 4a should decrease, the temperature responsive bellows 75 contracts to pull pivot 76a upwardly, rotate lever 68 clockwise about pivot 70, raise pilot 59, and supply liquid from port 63 through conduit 64 to the lower piston 58. This moves contact 52a to reduce the resistance in nozzle setting rheostat 52 so that the current to nozzle control coil 46 is increased, pilot 42 is pulled down against the bias of spring 42c to admit operating liquid from port 43 to move piston 11b upwardly and close the variable nozzle 5. This has the effect of reducing the pressure drop across turbine wheel 3, so that the speed of compressor 1 tends to be reduced. The resulting decrease in the supply of air to the combustion system will, of course, tend to increase the temperature of the exhaust gases for a given rate of fuel supply.

During all this time, the fuel regulator 17 has been positioning the throttle valve 16 in such a way as to hold the output shaft speed constant, or to vary it according to a preselected schedule as determined by the master control panel 17a. Thus it will be seen that, while the operation of the various subcombinations has been described separately, the integrated working of the entire system is enormously complicated due to the inter-relation of the fuel supply rate, changes in compressor speed effected by the adjustment of nozzle 5, and the variations in fuel rate produced by regulator 17 in an attempt to hold output shaft speed constant in spite of changes in the variable nozzle and in the power requirements of the consumer 6.

It will be observed that the exhaust temperature control characteristics are determined by the shape of cam 55, the speed control range is determined by the characteristics of the nozzle setting rheostat 52, while the compressor speed versus variable nozzle position is dependent on the rheostat 50.

The range of variation of the adjustable nozzle 5 is indicated diagrammatically in Fig. 2. A single blade 5a is shown in section as occupying the "normal" position, being that angle at which it would ordinarily be set in a conventional fixed nozzle ring. This normal position is represented by the "zero line" in Fig. 2. In ordinary operation, the blades 5a will be positioned in the closing direction clockwise to the "minus 5°" line shown in Fig. 2 and counterclockwise to the "plus 10°" normal open position. However, the variable nozzle 5 may also be arranged to move much further, to the "maximum open" position represented by the "plus 30°" line, in which the motive fluid is directed into the buckets of turbine rotor 4 at such an angle that the efficiency thereof is greatly reduced, or the blade design may be such that delivery of motive fluid to the rotor 4 when blades 5a are in this maximum open position will exert a braking effect on the output rotor.

Movement of the nozzle to this maximum open position may be effected automatically in response to an overspeed condition of the rotor shaft 4, as for instance by a suitable speed responsive device such as the flyball governor indicated generally at 83 as being driven from the turbine rotor shaft 4 and arranged to close a switch 83a to complete the circuit through conductors 84 from a suitable source of power to a solenoid valve indicated diagrammatically at 85 as being arranged to quickly dump the hydraulic liquid from the nozzle positioning cylinder 11. Release of this hydraulic pressure permits piston 11b to move downwardly under the bias of spring 11c, so the variable nozzle 5 is quickly moved to the "maximum open" position. Thus with the emergency overspeed governor 83, the variable nozzle mechanism can play an important part in preventing dangerous overspeed conditions of the output rotor 4 in the event the rotor 4 should suddenly lose its load. It may also be noted that failure of the electrical control circuits will cause the nozzle control solenoid 46 to permit pilot 42 to rise, thus releasing the pressure in nozzle control motor 11 and again permitting it to move to the open position. Thus the nozzle regulator is designed to "fail safe."

While only one specific embodiment of the invention has been described in detail, it will be obvious to those skilled in the art that many modifications and substitutions of equivalents may be made without departing from the essence of the invention. It will be seen that suitable mechanical speed-responsive devices might be substituted for the tachometer generators 9, 10, with mechanical linkage connections for positioning the respective pilots 21, 42. Likewise other types of fuel regulators might be substituted for the regulator 17 to vary the fuel rate so as to maintain output shaft speed constant. Also, electrical components, including a thermopile responsive to exhaust gas temperature with suitable amplifiers and solenoids, might be used to position the pivot 76a of the exhaust temperature regulator 19 in accordance with the exhaust gas temperature. Instead of the compressor discharge pressure responsive bellows 79, some other device responsive to the rotational speed of the compressor 1 (such as a tachometer generator or mechanical flyball governor) could be employed to position the pivot 80.

Still other changes will occur to those skilled in the art, and it is desired to cover by the appended claims all such modifications as fall within the true spirit and scope of the invention.

What I claim as new and desire to secure by Letters Patent of the United States is:

1. In a regulating system for a gas turbine powerplant having a compressor-combustor-turbine unit and a load output turbine unit, the compressor turbine rotor discharging the motive fluid through a variable nozzle ring to the load output turbine rotor, said rotors being mechanically independent, the combination of means responsive to speed of the load output turbine rotor for regulating the supply of fuel to the combustion system, and means responsive to the temperature of the motive fluid exhausted from the load turbine for varying the setting of the adjustable turbine nozzle to maintain output turbine exhaust temperature substantially constant.

2. In a regulating system for a gas turbine powerplant having a compressor-combustor-turbine unit and a load output turbine unit with a rotor mechanically independent of the compressor-turbine rotor, said rotors being in series flow relation with variable nozzle means therebetween, the combination of means responsive to a load condition of the output turbine for regulating the supply of fuel to the combustion system, and means responsive to an exhaust temperature condition for adjusting the variable turbine nozzle to maintain turbine exhaust temperature substantially constant.

3. In a regulating system for a gas turbine powerplant having a compressor-combustor-turbine unit and a load output turbine unit, the load output turbine rotor being mechanically independent of the compressor-turbine rotor, the compressor turbine and the output turbine being arranged in series flow relation with a variable angle nozzle ring for directing motive fluid received from the compressor turbine rotor into the output turbine rotor, the combination of means responsive to the speed of the load output turbine rotor for regulating the supply of fuel to the combustion system, and means responsive to the temperature of the output turbine exhaust gas for opening the variable turbine nozzle when the exhaust temperature rises and closing the nozzle when the exhaust temperature falls.

4. A regulating system in accordance with claim 3 and including means responsive to compressor rotor speed for modifying the action of the nozzle regulator to maintain turbine exhaust temperature substantially constant.

5. Regulating means in accordance with claim 3 and including means responsive to compressor discharge pressure for modifying the action of the variable nozzle regulator to hold turbine exhaust temperature substantially constant.

6. In a regulating system for a gas turbine powerplant having a compressor-combustor-turbine unit and a load output turbine unit, the compressor turbine rotor and output turbine rotor being mechanically independent with variable nozzle means adapted to receive motive fluid from the compressor turbine rotor and deliver it to the output turbine rotor, the combination of means responsive to a load condition of the output turbine for regulating the supply of fuel to the combustion system, and means jointly responsive to the temperature of motive fluid exhausted from the load turbine and to compressor rotor speed for opening the adjustable turbine nozzle when the exhaust temperature rises above a preselected value and closing the nozzle when the exhaust temperature falls below said preselected value.

7. In a regulating system for a gas turbine powerplant having a compressor-combustor-turbine unit and a load output turbine unit, the compressor-turbine rotor and output turbine rotor being mechanically independent and having variable nozzle means adapted to receive motive fluid from the compressor turbine rotor and deliver it to the output turbine rotor, the combination of means responsive to speed of the output turbine rotor for regulating the supply of fuel to the combustion system, and means jointly responsive to the temperature of motive fluid exhausted from the load turbine and to compressor rotor speed for opening the variable nozzle when the output turbine exhaust temperature rises above a preselected value and closing the nozzle when exhaust temperature falls below said value.

8. In a regulating system for a gas turbine powerplant having a compressor-combustor-turbine unit and a load output turbine unit with mechanically independent rotors, the compressor turbine receiving motive fluid from the combustion system and discharging through variable nozzle means to the output turbine rotor, the combination of single-acting hydraulic motor means with a piston connected to position the variable nozzle in opening direction and having a spring biasing the piston in the nozzle-closing direction, hydraulic pilot means for supplying operating liquid to said hydraulic motor to position the variable nozzle in the opening direction against the bias of said spring and for draining operating liquid from the motor to effect positioning of the nozzle in the closing direction, and means responsive to the temperature of motive fluid exhausted from the output turbine for positioning said pilot to open the variable nozzle when exhaust temperature rises and close the nozzle when exhaust temperature falls.

9. Regulating means in accordance with claim 8 and including means responsive to the speed of the compressor-turbine rotor for modifying the action of the exhaust temperature responsive means to maintain exhaust temperature substantially constant at the preselected value.

10. In a regulating system for a gas turbine powerplant having a compressor-combustor-turbine unit and a load output turbine unit with mechanically independent rotors, the compressor turbine rotor and output turbine rotor being in series flow relation with a variable nozzle adapted to direct motive fluid received from the compressor turbine into the output turbine rotor, the combination of exhaust temperature control means comprising regulating means for the variable turbine nozzle including first hydraulic motor means for positioning the variable nozzle and first hydraulic pilot means for effecting actuation of said nozzle motor, second hydraulic motor means, means connecting the second hydraulic motor to position said first pilot, second hydraulic pilot means adapted to position the second hydraulic motor, and means jointly responsive to output turbine exhaust temperature and compressor turbine rotor speed for positioning the second hydraulic pilot to cause the first hydraulic motor to open the variable turbine nozzle when exhaust temperature rises and close the nozzle when exhaust temperature falls whereby the temperature of the exhaust gas is maintained substantially constant at a preselected value.

11. In an exhaust temperature regulator for a gas turbine powerplant having a compressor-combustor-turbine unit and a load output turbine unit, said units having mechanically independent rotors with adjustable nozzle means disposed in series flow relation between the compressor turbine and the output turbine, the combination of motor means for positioning the variable nozzle, first servo-mechanism including means responsive to the speed of the compressor-turbine rotor for effecting actuation of the nozzle positioning motor to close the nozzle when compressor speed rises and open the nozzle when compressor speed falls, means for setting the speed of the compressor-turbine rotor by modifying the action of said first servo-mechanism, and means for adjusting said speed setting means comprising a second servo-motor connected to position the speed setting means and pilot means for effecting actuation of said second motor, and means connected to position said second pilot including means responsive to the temperature of motive fluid exhausted from the load output turbine and means responsive to the compressor shaft speed.

12. In an exhaust temperature regulator for a gas turbine powerplant having a compressor-combustor-turbine unit and a load output turbine unit with mechanically independent rotors and variable nozzle means disposed in series flow relation between the compressor turbine rotor and the output turbine rotor, the combination of motor means for positioning the variable nozzle, first servo-mechanism including means responsive to the speed of the compressor-turbine rotor for effecting actuation of the nozzle positioning motor to close the nozzle when compressor speed rises and open the nozzle when compressor speed falls, means for setting the speed of the compressor-turbine rotor by modifying the action of said first servo-mechanism, and means for adjusting said speed setting means comprising a second servo motor connected to position the speed setting means and pilot means for effecting actuation of said second motor, and means connected to position said second pilot in accordance with the temperature of the motive fluid exhausted from the load output turbine.

13. In a regulating system for a gas turbine powerplant having a compressor-combustor-turbine unit and a load output turbine unit, said units having mechanically independent turbine rotors arranged in series flow relation with variable nozzle means disposed between the compressor turbine and the output turbine, the combination of means responsive to output turbine rotor speed for regulating the supply of fuel to the combustion system, motor means for positioning the variable turbine nozzle to a maximum open position for minimum conversion of energy by the output turbine, and means responsive to an overspeed condition of the output turbine rotor adapted to cause the nozzle regulating means to move the variable nozzle to said maximum open position, whereby the conversion of energy by the load output turbine is substantially reduced in the event of an emergency overspeed condition.

14. In a regulating system for a gas turbine powerplant having a compressor-combustor-turbine unit and a load output turbine unit with mechanically independent turbine rotors arranged in series flow relation with variable nozzle means disposed therebetween, the combination of motor means for positioning the variable turbine nozzle to a maximum open position for minimum conversion of energy by the output turbine, said motor means including a single acting hydraulic motor with spring means biasing the motor in the nozzle opening direction and having hydraulic pilot means for supplying operating liquid to the motor to move the piston in the nozzle closing direction, dump valve means connected to quickly drain operating liquid from said hydraulic motor, and means responsive to an overspeed condition of the output turbine rotor for opening said dump valve to cause the hydraulic motor to move the variable nozzle quickly to said maximum open position, whereby the conversion of energy by the output turbine is substantially reduced in the event of such emergency overspeed condition.

NEAL E. STARKEY.

REFERENCES CITED

The following references are of record in the file of this patent:

UNITED STATES PATENTS

| Number | Name | Date |
|---|---|---|
| 2,219,994 | Jung | Oct. 29, 1940 |
| 2,505,796 | Sédille | May 2, 1950 |